J. H. GRAVELL.
METHOD OF SECURING TOGETHER HEAVY STEEL PLATES.
APPLICATION FILED JULY 26, 1918.

1,296,651.  Patented Mar. 11, 1919.

INVENTOR
James H. Gravell
BY
Townsend & Decker
ATTORNEYS

UNITED STATES PATENT OFFICE.

JAMES H. GRAVELL, OF BROOKLYN, NEW YORK, ASSIGNOR TO THOMSON SPOT WELDER COMPANY, OF BOSTON, MASSACHUSETTS, A CORPORATION OF MASSACHUSETTS.

METHOD OF SECURING TOGETHER HEAVY STEEL PLATES.

1,296,651.     Specification of Letters Patent.     Patented Mar. 11, 1919.

Application filed July 26, 1918. Serial No. 246,826.

*To all whom it may concern:*

Be it known that I, JAMES H. GRAVELL, a citizen of the United States, and a resident of Brooklyn, in the county of Kings and State of New York, have invented certain new and useful Improvements in Methods of Securing Together Heavy Steel Plates, of which the following is a specification.

This invention relates to uniting heavy plates of metal face to face by means of an auxiliary member such as a slug or rivet and utilizes the electric heating and welding process to effect this end.

The object of the invention is to secure a strong joint between heavy plates or sheets in a quick and efficient manner.

It is well known that spot welding is a very satisfactory process on relatively thin sheets of metal but when the sheets are of considerable thickness, for example around one half an inch thick and upward, the spot welding process becomes unsatisfactory owing to the enormous electric currents required and owing to inability to secure suitable electrodes which will retain the taper end under the enormous pressure necessary.

Heretofore it has been the custom to assemble heavy plates by means of rivets, either fire heated or electrically heated. The riveting has many objections however, the principal one being the necessity of registering the holes in the two plates through which the rivet blank must pass.

The present invention resembles a combination of the riveting and spot welding processes and it consists in the improved method of securing plates together face to face hereafter more particularly described and then specified in the claims.

In the accompanying drawings, Figure 1 illustrates a cross-section through two heavy plates assembled for welding according to this invention.

Figure 7:
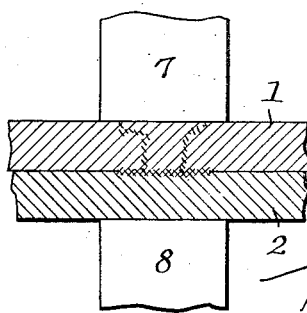

Fig. 7 diagrammatically illustrates the final step and shows a cross-section through the finished joint.

1 and 2 indicate two heavy plates of metal superposed on each other in surface contact. The plate 1 is provided with a perforation 3 while the plate 2, at least in so far as the part in line with the hole 3 is concerned, is imperforate.

Figure 4:
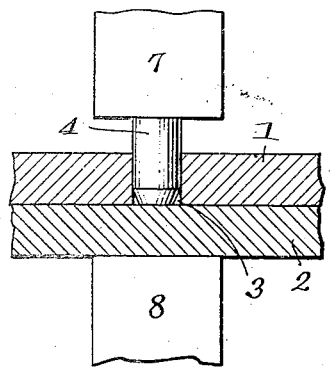
Fig. 4 is a diagrammatic view illustrating a slight modification in the process.

A rivet blank 4 preferably having a tapered end 5 is inserted in the hole 3 with the end 5 abutted against the surface of the plate 2. The outer end of the rivet blank may be provided initially with the usual head 6 or it may initially be merely a straight shank as shown in Fig. 4.

The parts are assembled between current and pressure supplying blocks 7 and 8. These blocks form the terminals of the secondary circuit of an electric transformer and pass current from one to the other through the interposed work and also apply pressure thereto all as well understood to those skilled in the electric welding art.

Preferably the lower surface of the upper block 7 is flat and engages the upper part of the rivet head 6 and upon starting the flow of current it passes from the block 7 through the rivet blank 4, across the contact between the tapered end 5 and the plate 2 and through the plate 2 to the block 8. This flow of current causes the end of the rivet blank and that part of the plate 2 with which it contacts to become heated and softened and upon application of pressure by means of the block 7 the parts are commingled and welded together at this place, the rivet head 6 seating on the outer surface of the plate 1 as indicated in Fig. 2.

Figure 1:
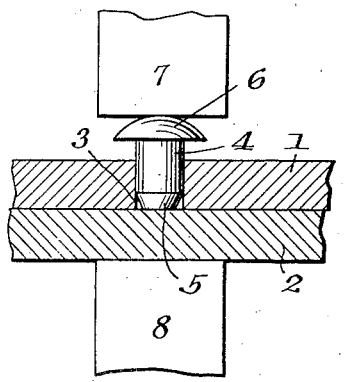
Figure 2:
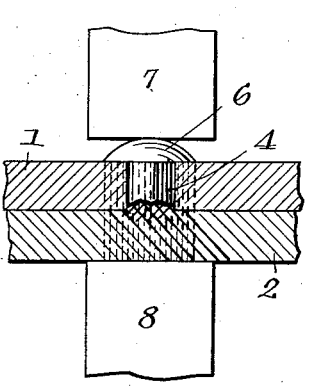
Fig. 2 is a similar view showing a subsequent stage of the operation.
Figure 3:
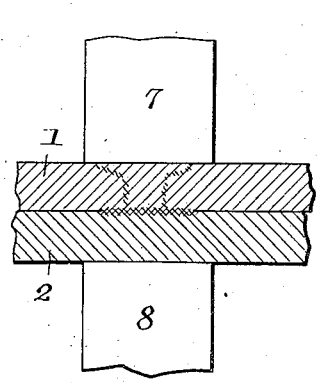
Fig. 3 is a similar view showing the end of the operation.

The pressure is maintained and the flow of current is continued and the head 6 now acts as a slug or button transmitting the current and pressure from the block 7 so that the current now flows not only through the rivet shank 4 but also through the plates 1 and 2 direct, its path being widened out as indicated by the dotted lines in Fig. 2. The head 6 at this time localizes the welding pressure and the flow of current in the meeting surfaces of the plates 1 and 2 and the continuation thereof for the desired interval results in the formation of an effective welding of the material of the meeting faces of the plates 1 and 2 to one another by a weld of an area and form practically conforming to the head 6. The current and pressure are preferably continued until the head is embedded in the plate 1 at which time the plates and the rivet blank are united together by a homogeneous weld as indicated in Fig. 3.

Instead of initially providing the rivet blank with a head to act as a slug or button to transmit the current and pressure direct through both plates in the intermediate stage of the process, the rivet blank may in the initial stage be a straight shank without a head as indicated in Fig. 4.

Figure 5:
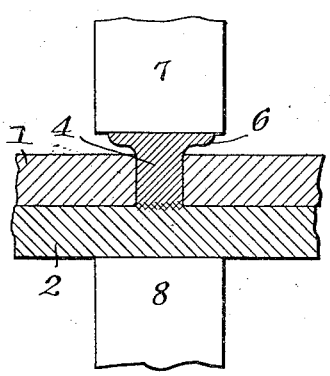
Figs. 5 and 6 illustrate further steps in the operation.
Figure 6:
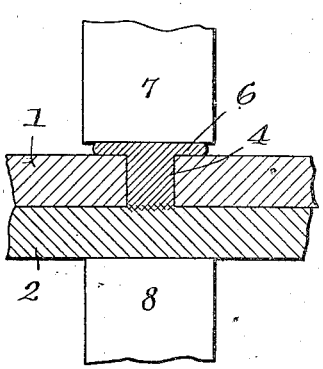

In this case the flow of current from one block to the other through the work and the application of pressure causes the outer end of the rivet blank 4 to mushroom and form the head 6 as indicated in Fig. 5 and the current and pressure continuing, the head seats on the plate 1 and acts as in the previously described case to localize the current and pressure in the meeting surfaces of the plates and effect a welding thereof as previously described and as indicated in Fig. 7.

It will be understood that my invention is not limited in any manner except as may be specified in the appended claims.

What I claim as my invention is:

1. The method of securing two members together, consisting in providing a perforated member, passing a rivet blank through said member and into contact with the other member, electrically welding said blank to the second named member, continuing the current and pressure until the head of the rivet engages the perforated member and thereafter to cause the head to act as a slug or button to weld the three members together.

2. The method of securing two members together, consisting in providing a perforated member, passing a rivet blank through said member and into abutted contact with an imperforate surface of the other member, electrically welding said blank to the imperforate member, forcing the rivet head into contact with the perforated member and passing the heating current and pressure through the members in line with said head to cause the plates to weld direct to each other.

3. The method of securing two members together, consisting in providing one member with a perforation, superposing the members, inserting a rivet blank through the perforation and into contact with an imperforate surface of the other member, electrically welding said rivet to the imperforate member and continuing the current and pressure after the rivet head has become seated to cause the three members to weld together.

4. The method of uniting two plates, consisting in providing a perforated and an imperforate plate, inserting a rivet blank through a perforation in one plate and abutted against the other plate, electrically welding the blank to the imperforate plate and at the same time causing the outer end of the blank to mushroom over on the outer surface of the perforated plate and continuing the current and pressure to weld the plates direct to each other.

5. The method of uniting plates, consisting in superposing a perforated and an imperforated plate, inserting a rivet blank through the perforated plate and into abutted contact with the other plate, electrically welding the blank to the imperforate plate while at the same time causing the blank to mushroom and form a head on the outside of the plate and thereafter continuing the current and pressure to cause the plates to be welded direct to each other by means of said head.

Signed at New York, in the county of New York and State of New York, this 25th day of July A. D. 1918.

JAMES H. GRAVELL.

Witnesses:
F. B. TOWNSEND,
F. E. ROESLER.